United States Patent [19]
Collins, Jr. et al.

[11] Patent Number: 5,274,491
[45] Date of Patent: Dec. 28, 1993

[54] DYNAMIC LASER DIODE APERTURE FOR OPTICAL SCANNERS

[75] Inventors: Donald A. Collins, Jr.; Charles K. Wike, Jr., both of Cambridge; Stephen J. Ames, New Concord, all of Ohio

[73] Assignee: NCR Corporation, Dayton, Ohio

[21] Appl. No.: 699,083

[22] Filed: May 13, 1991

[51] Int. Cl.⁵ .................. G02B 26/02; G02B 26/08; G02B 5/00

[52] U.S. Cl. .................. 359/200; 359/212; 359/220; 359/894; 359/900; 235/455; 235/467

[58] Field of Search .......... 359/196, 198, 205, 209, 359/872, 894, 896, 197, 200, 212, 220; 235/454, 455, 462, 473, 467, 472

[56] References Cited

U.S. PATENT DOCUMENTS

| | | | |
|---|---|---|---|
| 3,588,249 | 6/1971 | Studebaker | 250/236 |
| 4,699,447 | 10/1987 | Howard | 359/220 |
| 4,722,581 | 2/1988 | Hamada et al. | 359/205 |
| 4,967,076 | 10/1990 | Schuhmacher et al. | 359/216 |
| 4,971,410 | 11/1990 | Wike, Jr. et al. | 350/6.5 |
| 5,074,628 | 12/1991 | Khattak et al. | 359/205 |

Primary Examiner—Bruce Y. Arnold
Assistant Examiner—R. D. Shafer
Attorney, Agent, or Firm—Paul W. Martin

[57] ABSTRACT

A dynamic laser diode aperture for collimating light from a laser diode within an optical scanner which increases the power of the beam to a predetermined maximum. The optical scanner includes a motor having a hollow circular shaft through which the light passes. A lens member focuses the light, and the dynamic aperture, located within a cap member within an end of the motor shaft closest to the laser, collimates the focused light. The dynamic aperture approximates the shape of the unfocused light pattern from the laser diode. In the preferred embodiment, the dynamic aperture is generally rectangular in shape and rotates with the motor shaft.

9 Claims, 2 Drawing Sheets

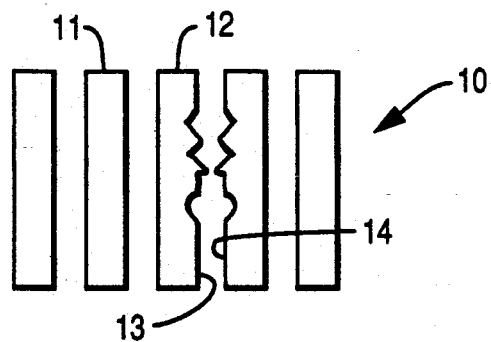
FIG. 1
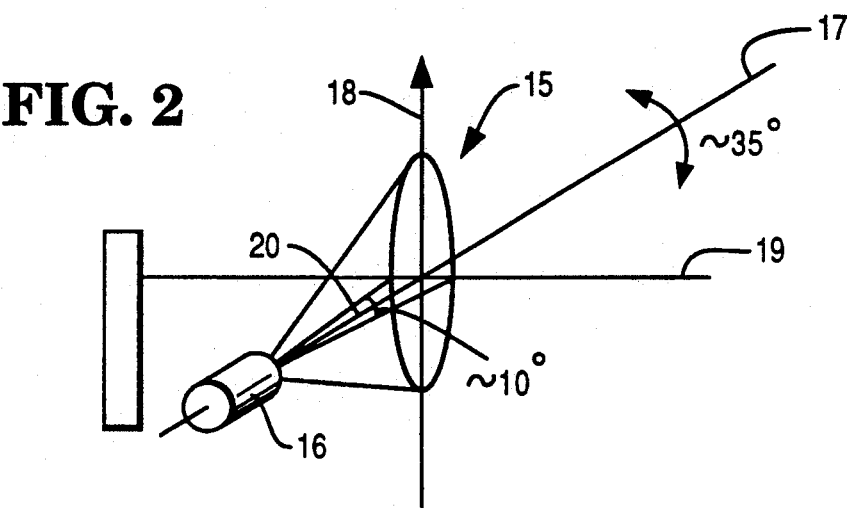
FIG. 2
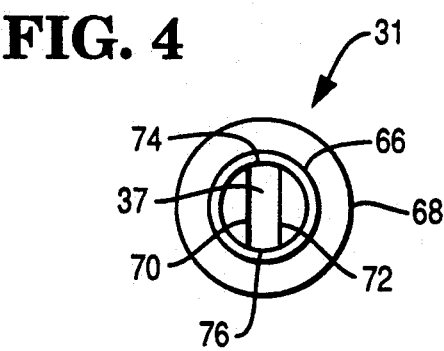
FIG. 4
FIG. 5
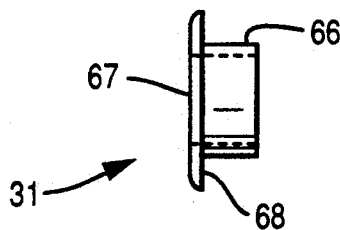
FIG. 6
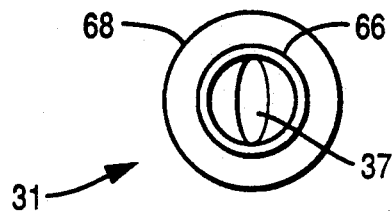

DYNAMIC LASER DIODE APERTURE FOR OPTICAL SCANNERS

BACKGROUND OF THE INVENTION

The present invention relates to optical scanners and more specifically to a dynamic laser diode aperture for optical scanners.

Optical scanners are well known for their usefulness in retail check out and inventory control. Optical scanners generally employ a laser diode, the light from which is focused and collimated to produce a scanning beam. An optical transceiver directs the beam against a plurality of stationary mirrors, and collects the beam after it is reflected by a bar code label. A motor rotates the optical transceiver, and a detector receives the returning beam. The pattern produced by such a scanner is characterized by lines oriented at various angles to one another. An example of an optical scanner can be found in commonly assigned U.S. Pat. No. 4,971,410, entitled, "Scanning and Collection System for a Compact Laser", issued Nov. 20, 1990, to Wike, Jr. et al. This patent is hereby incorporated by reference.

The laser diodes used in optical scanners exhibit both desirable and undesirable characteristics. Unfocused laser light produces a scanning ellipse, which is suitable only for use in optical scanners which generate scan lines in one direction, and which is suitable for scanning bar code labels as long as the minor axis of the ellipse is oriented perpendicular to the lines and spaces of the bar code label. Furthermore, laser output power has two propagation axes, one axis diverging around thirty-five degrees and the other axis diverging around ten degrees. Thus, the asymmetry of the scanning ellipse makes light collection techniques in optical scanners difficult. On the other hand, light from the scanning ellipse generates more optical power than focused and collimated light, and reduces print defects by averaging them to yield a modulated signal with less print-generated noise.

Known focusing techniques for optical scanners, such as the scanner disclosed in Wike, Jr., employ a single focusing lens followed by a circular aperture. The circular aperture determines the size of the laser beam projected at a reference plane. Since the size of the aperture remains constant, it may be referred to as a "static" aperture. However, the circular static aperture attenuates as much as eighty-five percent of the available light power from the laser diode because the diameter of the circular aperture must be limited to maintain the optimum "F" number for a proper beam profile about the primary focus.

Therefore, it would be desirable to produce an optical scanner which incorporates the high power and low noise advantages of the scanning ellipse.

SUMMARY OF THE INVENTION

In accordance with the teachings of the present invention, a dynamic laser diode aperture for optical scanners is provided. The optical scanner includes a laser diode, a lens for focusing the laser light, and a motor having a hollow circular shaft through which the laser light is channeled. The dynamic aperture is located within a cap member inserted in an end of the motor shaft closest to the laser and has a shape approximating the elliptical shape of the unfocused light pattern from the laser diode. In the preferred embodiment, the aperture is generally rectangular in shape for ease of manufacturing. The aperture is operative to allow more energy to be emitted for scanning than stationary or dynamic circular apertures as it rotates with the motor shaft.

It is accordingly an object of the present invention to provide a dynamic laser diode aperture.

It is another object of the present invention to provide a dynamic laser diode aperture which produces a collimated light beam having more power than light beams from scanners employing static circular apertures.

It is another object of the present invention to provide a dynamic laser diode aperture which produces a collimated light beam having more power than light beams from scanners employing static circular apertures and whose shape approximates the shape of the unfocused light pattern from the laser diode.

It is another object of the present invention to provide an apparatus for containing the aperture.

It is another object of the present invention to provide an apparatus for containing the aperture which is easily installed into existing scanners.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

FIG. 1 is a representation of a bar code label containing print defects;

FIG. 2 is a scanning ellipse generated by a laser diode;

FIG. 4 is a rear view of an end cap member containing the dynamic laser diode aperture of the present invention;

FIG. 5 is a side view of the end cap member of FIG. 4; and

FIG. 6 is a rear view of a second embodiment of the present invention.

DETAILED DESCRIPTION OF THE PREFERRED EMBODIMENT

Figure 3:
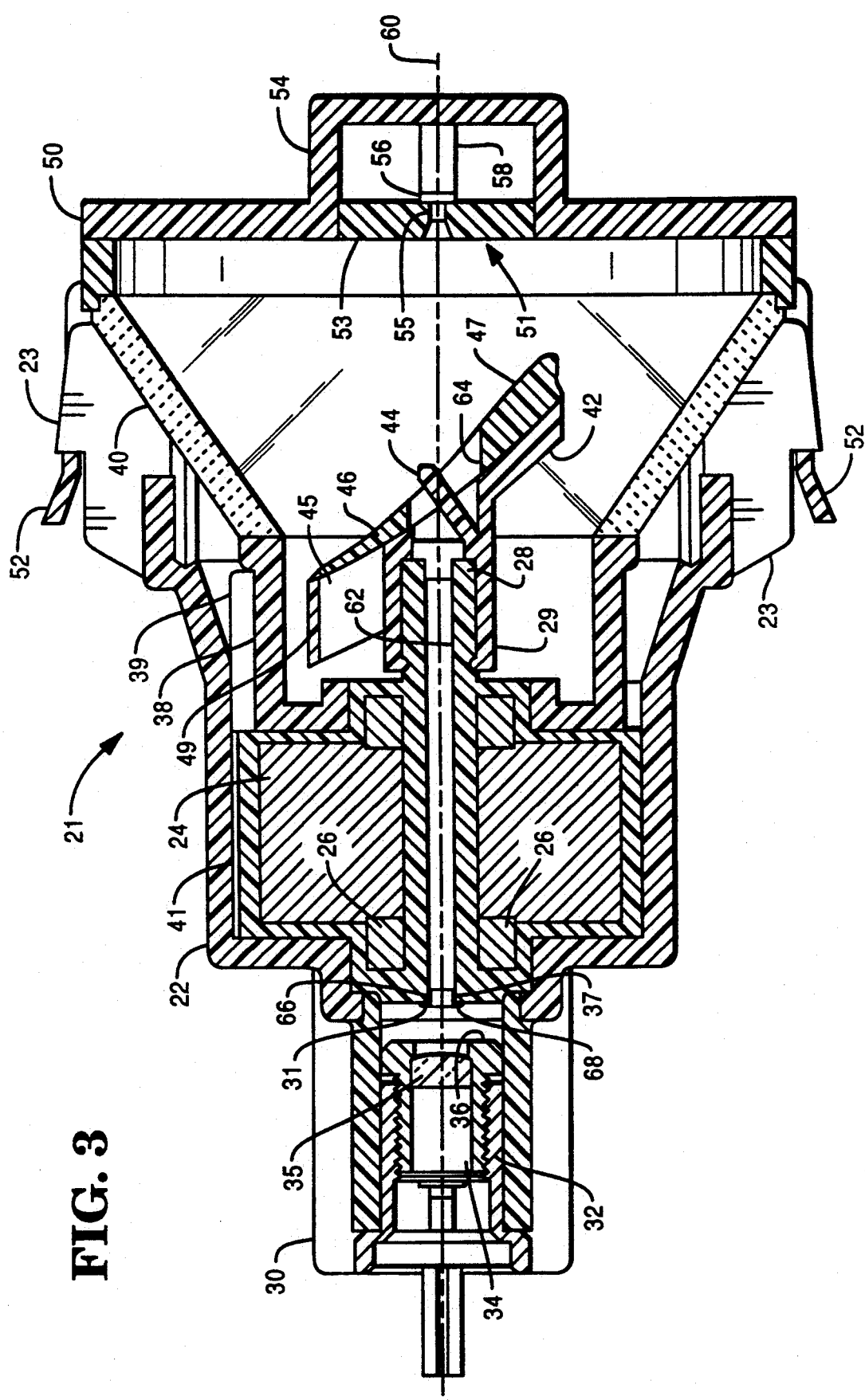
FIG. 3 is an optical scanner employing the dynamic laser diode aperture of the present invention.

Turning now to FIG. 1, a bar code label 10 having lines and spaces is shown. Typically, bar code labels suffer from printing defects. Lines 11 and 12 are characterized by irregularities on the surfaces 13 and 14 between them, which cause the shortest distance between bars 11 and 12 to vary along these surfaces. Since scanners read the distance between the bars, this variation in distance can cause erroneous readings.

Referring now to FIG. 2, there is shown a scanning ellipse 15 from a laser diode 16. The laser diode 16 has propagation axes 17, 18, and 19. Axis 17 coincides with the center of beam 20. Axes 18 and 19 are useful in measuring the divergence of the beam 20 from the axis 17. Axis 18 measures vertical divergence along the major axis of the scanning ellipse 15, while axis 19 measures horizontal divergence along the minor axis of the scanning ellipse 15. Both vertical and horizontal divergence are symmetric about the center axis 17, the vertical divergence approximating seventeen and a half degrees either side of the center axis 17 for a total of thirty-five degrees and the horizontal divergence approximating five degrees either side of the center axis 17 for a total of ten degrees.

Referring now to FIG. 3, there is shown an optical scanner 21 employing the dynamic laser diode aperture of the present invention. The optical scanner 21 includes a molded frame support member 22 having a plurality of latching portions 23. The frame support member 22 may be molded of any type of shock resistant plastic material such as polycarbonate. Mounted within the support member 22 is a motor 24. Journaled within the motor 24 by bearings 26 is a hollow drive shaft 28 extending through the motor 24. Mounted within a rear extension portion 30 of the frame support member 22 is a brass laser diode member 32 and a brass laser diode 34 and a collimating and focusing lens member 35 both of which are in alignment with the spin axis 60 of the drive shaft 28. The diode 34 outputs a diverging light beam which is collimated and focused on a reference plane (not shown) in front of the optical scanner 21 by the lens member 35 and the dynamic aperture 37. Dynamic aperture 37 is contained within end cap member 31, which is inserted into the bore 62 of the end of the motor shaft 28 closest to the laser diode 34. Circular aperture 36 is large enough to allow a beam from the laser diode 34 to pass through virtually unobstructed and unattenuated.

Slidably mounted within the frame support member 22 is a molded mirror support member 38 constructed of any type of polycarbonate plastic which includes a plurality of acrylic turning or pattern mirrors 40, each of which extends outwardly from the support member 38 at an angle of approximately thirty-three degrees and in which each mirror is offset to each of the other mirrors 40 by approximately three degrees. The number of mirrors employed is controlled by the number of scan lines required for the scan pattern. In the optical scanner 21, there are eight turning mirrors. The mirrors have their reflecting surfaces coated with gold. The support member 38 includes a rearwardly extending key rib portion 39 which is positioned within a key slot 41 located in the frame support member 22 for snap fitting the support member 38 within the support member 22. Secured to the front end of the drive shaft 28 is one embodiment of an optical transceiver 42 comprising a flat deflecting mirror portion 44 which extends obliquely across the spin axis 60 of the drive shaft 28 and a collection mirror portion 46 which comprises a sloping aspheric concave surface 47 for collecting the scanning light beams reflected from a scanned bar code label. The optical transceiver 42 may be fitted over the shaft 28 using a snap fitting member 29 and may be molded of any type of transparent material such as a polycarbonate plastic material. The reflecting surfaces of the transceiver 42 are coated with gold which reflects the red light band while allowing all other bands of light to pass through the surface of the transceiver 42. In order to reduce the noise generated by the stray light passing through the transceiver 42, the rear surfaces of the transceiver 42 may be coated with silicon oxide which absorbs the light.

The deflecting mirror portion 44 extends through a slot 64 in the collecting surface 47 of the collection portion 46. The mirror portion is oriented at an oblique angle to the surface 47. The transceiver includes a rear portion 49 which includes a plurality of depending rib portions 45 which provide a balance to the transceiver when rotated about the spin axis. Mounted to the front portion of the mirror support member 38 is a transparent acrylic photodetector support member 50, having a plurality of flexible finger members 52 which snap over the latching portions 23 of the frame support member 22 for holding the photodetector support means 50 to the mirror support member 38. Coating the reflecting surfaces of the mirrors 40 and the transceiver 42 with gold, together with the use of the acrylic support member 50, provides high reflectivity and transmission of light. Mounted within a protruding housing portion 54 of the support member 50 is a detector assembly 51 comprising a support member 53 having a limiting aperture 55 and a photodetector 56 secured to the member 53 and mounted within a holder 58 secured to the inside end portion of the housing portion 54.

Referring now to FIGS. 3, 4, and 5, the present invention includes an end cap member 31 which is easily inserted into the bore 62 of the end of the motor shaft 28 closest to the laser diode 34. In the preferred embodiment, the end cap member 31 is generally cylindrical in shape and is made of opaque polycarbonate plastic by known methods. A plug portion 66 fits snugly within the bore 62 and a lip portion 68 fits snugly against the end of the motor shaft 28. Dynamic aperture 37 approximates the shape of the unfocused light pattern from the laser diode, i.e., the scanning ellipse. In the preferred embodiment, it is generally rectangular in shape for ease of manufacture, having two long sides 70 and 72, and two short sides 74 and 76. In the preferred embodiment, the long sides 70 and 72 are straight and measure 3.0 millimeters, and the short sides 74 and 76 are curved, following the bore 62; the width of the dynamic aperture 37 is 1.2 millimeters. The axis 18 of the scanning ellipse 15 is oriented vertically and in line with the deflecting mirror 44 at the other end of the motor shaft 28.

Referring now to FIG. 6, an alternative embodiment of the present invention is shown. The end cap member 31 employs a dynamic aperture 37 having an elliptical shape.

In operation, dynamic aperture 37 allows more light energy to be emitted than a circular aperture. As the motor shaft 28 rotates, the dynamic aperture 37 and deflecting mirror 44 rotate. Laser diode 34 remains stationary with its major axis oriented vertically.

Advantageously, the generated scan pattern includes horizontal lines which possess the desirable characteristics of the static scanning ellipse 15. The effects of print defects are reduced because the horizontal scan lines are those of the scanning ellipse 15. The vertical scan lines look like those generated by a circular aperture since the width of the dynamic aperture 37 limits the major axis 18 of the scanning ellipse 15 when the dynamic aperture 37 is oriented ninety degrees to the scanning ellipse 15.

Use of the dynamic aperture 37 also allows more power for scanning. Maximum power output occurs in the horizontal lines when the dynamic aperture 37 is aligned with the scanning ellipse 15, while minimum power output occurs in the vertical lines when the dynamic aperture 37 is oriented ninety degrees to the scanning ellipse 15. Scan lines which are neither vertical nor horizontal have characteristics between those extremes. For all scan lines, the beam power is controlled by the width of the dynamic aperture 37. In addition, all scan lines satisfy the criterion that the minor axis 19 of the ellipse is perpendicular to the scan lines of the bar code label.

Although the invention has been described with particular reference to certain preferred embodiments thereof, variations and modifications of the present invention can be effected within the spirit and scope of the following claims.

What is claimed is:

1. An optical scanning apparatus for collimating focused light from a laser diode, which produces an unfocused light pattern having a predetermined shape, the apparatus comprising:
    a hollow motor shaft through which light from the diode passes; and
    a cap member disposed within one end of the motor shaft closest to the laser diode having an elliptical aperture therethrough having a major axis greater than the minor axis and being defined by an inner surface of the member.

2. The apparatus as recited in claim 1, wherein said cap member comprises a plug member and a lip member, said lip member extends radially outwardly from an end of the plug member closest to said laser diode and has a diameter greater than the diameter of the plug member.

3. The apparatus as recited in claim 1, wherein the cap member is made of opaque plastic.

4. An optical scanning apparatus for collimating focused light from a laser diode, which produces an unfocused light pattern having a predetermined shape, the apparatus comprising:
    a hollow motor shaft through which light from the diode passes; and
    a cap member disposed within one end of the motor shaft closest to the laser diode including a plug member having an aperture therethrough defined by an inner surface of the plug member, said aperture having a generally elliptical shape having a major axis greater than the minor axis and said cap member further including a lip member, extending radially outwardly from an end of the plug member closest to said laser diode, having a diameter greater than the diameter of the plug member.

5. A method for collimating focused light from a laser diode in an optical scanning apparatus which produces an unfocused light pattern having a predetermined shape, the method comprising the steps of:
    channeling said focused light through a cap member having a generally elliptical aperture, said aperture having a major axis greater than the minor axis, and said member being disposed within one end of a hollow motor shaft closest to said laser diode; and
    rotating the shaft and the elliptical aperture relative to the laser diode.

6. An optical scanning apparatus for collimating focused light from a laser diode, which produces an unfocused light pattern having a predetermined shape, the apparatus comprising:
    a hollow motor shaft through which light from the diode passes; and
    a cap member disposed within one end of the motor shaft closest to the laser diode having a generally rectangular aperture therethrough defined by two parallel and straight edges of equal length and two curvilinear edges connecting the ends of the straight edges, the distance between the straight edges being less than the length of the straight edges.

7. The apparatus as recited in claim 6, wherein said cap member comprises a plug member and a lip member, said lip member extends radially outwardly from an end of the plug member closest to said laser diode and has a diameter greater than the diameter of the plug member.

8. The apparatus as recited in claim 6, wherein the cap member is made of opaque plastic.

9. A method for collimating focused light from a laser diode in an optical scanning apparatus, which produces an unfocused light pattern having a predetermined shape, the method comprising the steps of:
    channeling said focused light through a cap member having a generally rectangular aperture, said aperture having a shape defined by two parallel and straight edges of equal length and two curvilinear edges, the distance between the straight edges being less than the length of the straight edges, said member being disposed within one end of a hollow motor shaft closest to said laser diode; and
    rotating the shaft and the rectangular aperture relative to the laser diode.

* * * * *